United States Patent [19]

Ballard et al.

[11] Patent Number: 5,005,456

[45] Date of Patent: Apr. 9, 1991

[54] HOT SHEAR CUTTING OF AMORPHOUS ALLOY RIBBON

[75] Inventors: Donald E. Ballard, Conover, N.C.; Peter G. Frischmann, Scottsdale, Ariz.; Alan I. Taub, Schenectady, N.Y.

[73] Assignee: General Electric Company, Schenectady, N.Y.

[21] Appl. No.: 250,805

[22] Filed: Sep. 29, 1988

[51] Int. Cl.[5] .................. B23D 15/08; B23D 33/08; B26D 7/10

[52] U.S. Cl. .................. 83/170; 83/176; 83/382

[58] Field of Search .................. 83/15, 16, 19, 29, 56, 83/170, 176, 641, 694, 382

[56] References Cited

U.S. PATENT DOCUMENTS 3,828,639 8/1974 Roch .................. 83/641

4,445,410 5/1984 Lazar, Jr. et al. .................. 83/694

FOREIGN PATENT DOCUMENTS 0229214 9/1988 Japan .................. 83/15

*Primary Examiner*—Hien H. Phan

*Attorney, Agent, or Firm*—Paul E. Rochford; James C. Davis, Jr.; James Magee, Jr.

[57] ABSTRACT

A method and apparatus for severing a stack of amorphous alloy ribbons in a softened state is disclosed. The method provides a smooth burr-free edge of close dimensional tolerance while preserving the desirable magnetic properties of the alloy. Resistance self-heating is applied to heat a localized portion of the stack to a temperature above the softening temperature of the alloy. Severing occurs adjacent the electrodes in an adjacent stack portion which is heated by diffusion from the directly heated stock portion.

1 Claim, 5 Drawing Sheets

T= THE TEMPERATURE IN °K OF THE SPECIMEN BEING REVAMPED &
$T_X$=THE TEMPERATURE IN °K OF THE ONSET OF CRYSTALLIZATION AT 20°C PER/MINUTE.
dT= THE CHANGE IN TEMPERATURE IN ° CENTIGRADE
d+= THE CHANGE IN TIME IN MINUTES

T = THE TEMPERATURE IN °K OF THE SPECIMEN BEING REVAMPED &
$T_X$ = THE TEMPERATURE IN °K OF THE ONSET OF CRYSTALLIZATION AT 20° C PER/MINUTE.
dT = THE CHANGE IN TEMPERATURE IN ° CENTIGRADE
d+ = THE CHANGE IN TIME IN MINUTES

HOT SHEAR CUTTING OF AMORPHOUS ALLOY RIBBON

The present invention relates in general to new and improved methods for cutting metal alloys, and in particular to a method for cutting an amorphous alloy in a localized heated area. As used herein the term "severing" means the cutting of a length of ribbon so that it is separated into two shorter lengths.

BACKGROUND OF THE INVENTION

Amorphous alloys exhibit a number of differences in their properties from the normal crystalline form of the same alloys. These differences make them especially suitable for certain applications. Amorphous alloys are harder, more abrasive and more sensitive to mechanical stresses and have higher mechanical strength, flexibility and electrical resistivity than the crystalline forms of the same alloys. Some amorphous alloys exhibit the softest magnetic characteristics of any known materials. This latter property is especially desirable for magnetic core materials since the ease with which the material can be magnetized and demagnetized controls the hysteresis losses experienced. These soft magnetic characteristics become important where the magnetic material is repetitively magnetized in opposite directions as it is, for example, in the case of magnetic cores of the type used in AC machinery.

Because of the way amorphous alloys are formed, only thin ribbons can be produced and such ribbons have a maximum thickness of about 0.076 mm. Typical thicknesses are from about 0.025 mm to about 0.05 mm. By contrast, prior art transformer core laminations are normally about ten times thicker. Thus, about ten times as many layers of amorphous metal ribbon are required to form a transformer core structure of a given cross section as are required to form the same structures of prior art steel laminations.

An important consideration in many applications where magnetic cores are used is the space factor. The space factor may be defined as the ratio of the volume of core material within the built up core to the volume of the built up core itself. The space factor is important because if the layers making up the core do not lie flat upon each other but remain separated by air or other non-magnetic material, the volume of the core is increased without a corresponding increase in its desirable magnetic properties. Ribbon irregularities increase the space factor. Thus, if burrs or other irregularities are present on the edges of the core laminations, the laminations will not lie flat and consequently the space factor is increased and thus degraded. The thinness dictated by the way amorphous metals are made adds to the problem. For example, edge and/or surface irregularities which are small enough to be ignored in conventional core laminations, may cause severe degradation of the space factor when ten or more times as many layers are used.

The deformation of any material requires the material to flow as it is forced or worked. At low temperatures the flow of amorphous alloys is governed by an inhomogeneous deformation mechanism characterized by high stress. The high stress causes two problems: a high rate of tool wear and loss of magnetic properties. If subjected to high stress, the tools used in the forming operations of articles that consist of amorphous alloys will have only short useful lives. It is also known that inhomogeneous deformation of amorphous alloys can be detrimental to the soft magnetic properties of the alloys. It is therefore desirable to avoid such high stress in deforming or working amorphous alloys.

As disclosed in Japanese patent application No. 132288 to *T. Masumoto,* published Nov. 5, 1976, some of the difficulties in forming amorphous alloys can be overcome or reduced by performing the forming operations at elevated temperatures. As set forth in that publication, forming processes should be applied to the amorphous alloy only at temperatures above the "ductile transition temperature", herein designated $T_p$. This same temperature, which is regarded as critical for working amorphous alloys, is also referred to as the "plastic transition temperature" in an article by Liebermann, in Mat. Sci. Eng., Vol. 46, p. 241 (1980). It is known that amorphous alloys can be deformed above this plastic transition temperature at low stresses to a high degree of straining. Such hot forming of a metallic glass at low stress is reported in D.H.R., "Proceedings Third International Conference on Rapidly Quenched Metals", by J. Patterson, A. L. Greer, J. A. Leake (Chameleon Press, 1978), p. 293 and was demonstrated by drawing a cup from a ribbon of amorphous alloy. More recently, as reported in Scripta Met. Vol. 14, p. 1331 (1980), strains approaching 100% in an amorphous alloy ribbon of PdFeSi were produced at stresses as low as 150 Mpa when deformation of the ribbon was carried out at high temperatures.

In none of the foregoing studies, nor in the methods developed from the studies, was any concern given to the effect of the rate of heating on the forming of the amorphous article. Primary consideration in each prior instance was given to the crystallization kinetics of the alloy. The object in these prior efforts was to effect the working of the alloy without imparting significant degrees of crystallinity to the article being formed and to retain the amorphous character of the alloy. The avoidance of crystallization was recognized in these prior efforts as a primary consideration in preserving the properties of the amorphous alloys.

U.S. Pat. No. 4,584,036, assigned to the present assignee, discloses a relationship between the softening and increase in workability of an amorphous alloy article and the rate at which the article is undergoing heating. As set forth in that patent, the heating history of the article, that is the heating or rate of heating to a certain temperature prior to working, must be distinguished from the effective rate at which an article is being heated at the time the working or forming of the article is taking place. This patent further discloses that amorphous alloys undergo a softening during the time when they are being heated at a relatively high heating rate. Further, the variation of the softening temperature with, or as a function of, the heating rate was determined in a quantitative manner.

U.S. Pat. No. 4,715,906 which is likewise assigned to the assignee of the present application, discloses a slightly different heating regimen. According to this regimen for heating rates of 1000° C./min. or higher, the viscosity of the alloy is so low that the softening window is enlarged in a temporal sense. The softening window is the difference between the temperature at which the alloy softens and that at which it crystallizes. When the heating rate is high enough this window is large enough for the amorphous alloy to retain its ability to be worked in an apparent "soft" state, even though the alloy is experiencing an isothermal hold of one to several seconds. Generally, the higher the rate of heating above 1000° C./min., the longer the isothermal hold which can be tolerated by the amorphous alloy article without loss of its favorable magnetic properties. These findings and the quantitative relationships developed that define the isothermal window, are all set out in the last-mentioned paragraph.

U.S. Pat. No. 4,670,636, assigned to the present assignee, discloses how the softening technique can be utilized to provide a method for parting a bundle of amorphous alloy articles. This is done by applying a tensile force to the article while rapidly heating a seam along the top article of the bundle to be cut. The top article separates into parts and the separated parts of the top article are then withdrawn and the next article of the bundle is exposed to the applied heat. It is known that heating of a relaxed amorphous alloy strip in a narrow region causes buckling and distortion of the strip, even though the heating is not sufficient to melt or even soften the material of the narrow region. Therefore, heating under the influence of tension according to the above patent is helpful in minimizing this buckling property and in keeping the ribbon flat.

Where an article of amorphous alloy is to be cut, e.g. by the use of opposed shear blades, the spacing of the blades normal both to the direction of the blade movement and to the blade edge, otherwise referred to as the gap, is critical to achieve a cut of good quality. The thicker the article to be cut, the wider the gap must be. Conversely, thin articles require a relatively narrow gap and small dimensional changes of the gap can affect the quality of the cut. If the gap is reduced below its optimum setting, the blades may jam and no cutting can occur. If the gap is increased above the optimum setting, excessive bending can occur before shearing is completed and can result in a burr. It is well known in the metal working industry that the expansion of shear blades due to undesired heating can reduce the gap between the shear blades to the point where they jam, i.e. where relative motion between them is no longer possible. Therefore, if heating of the article to be cut is expected, expansion of the shear blades must either be allowed for or prevented to preserve required shear blade gaps.

OBJECTS OF THE INVENTION

It is, accordingly, a primary object of the present invention to provide a new and improved method for severing amorphous alloy material which avoids the foregoing disadvantages.

A further object of the present invention is to provide a new and improved method for severing a stack of amorphous alloy ribbons in a single operation.

Another object is to provide a new and improved method for severing an amorphous alloy article without significantly degrading the beneficial magnetic properties of the article.

Still another object is to provide a new and improved method for severing an amorphous alloy so that a perpendicular smooth burr-free edge results which has close dimensional tolerances and which substantially avoids crystallization of the alloy at the edge.

An additional object is to provide a new and improved method for severing an amorphous alloy strip in a narrow heated region without buckling or distortion of the strip.

Another object is to provide new and improved apparatus for severing a stack of amorphous alloy ribbons in a localized softened region and for minimizing wear on the cutting edges of the shear mechanism by which severing is accomplished.

Another object is to provide new and improved apparatus for severing a stack of amorphous alloy ribbons.

Other objects and advantages of the subject invention will be in part apparent and in part pointed out specifically in the description which follows.

SUMMARY OF THE INVENTION

In one of its broader aspects, the objects of the present invention are achieved by severing a stack of amorphous alloy ribbons by the use of a shearing mechanism. In a preferred embodiment, a pressure pad, extending across the width of the stack, is activated to compress and hold the stack of ribbons under pressure against a stationary shear blade. Pressure, sufficient to reduce interfacial electrical resistances among the ribbons of the stack, is applied by the pad.

Electrodes are provided and incorporated into the pressure pad and stationary shear blade respectively and the electrodes are operatively connected to a power supply and a control device including a power supply switch mechanism. A heating current from the power supply is passed between the electrodes to heat a localized resistance heating zone of the portion of the stack disposed between the electrodes and accordingly between the contact areas.

In accordance with the present invention, the electrode contact areas of the shear blade and the pressure pad on the stack extend respectively at least across the stack width. However, these contact areas are kept narrow longitudinally of the ribbon stack to provide a current of high density. The high density current is desired to rapidly heat a very localized heating zone of the stack adjacent a separation path where the cut is to be made. The separation path itself lies within a diffused heat zone. The diffused heat zone is in turn heated quickly by thermal diffusion from the directly heated resistance heating zone. The duration and magnitude of the applied resistance heating current are controlled so as to provide the rapid heating rate necessary to produce softening without exceeding the crystallization temperature of the alloy material in the diffused heat zone. Severing occurs by forcing a movable shear blade through the separation path in the diffused heat zone toward the stationary shear blade.

BRIEF DESCRIPTION OF THE DRAWINGS

These and other features of the present invention, together with additional features and advantages thereof will become apparent from the following detailed description when read together with the accompanying drawings in which applicable reference numerals have been carried forward.

DETAILED DESCRIPTION OF THE INVENTION

Figure 1:
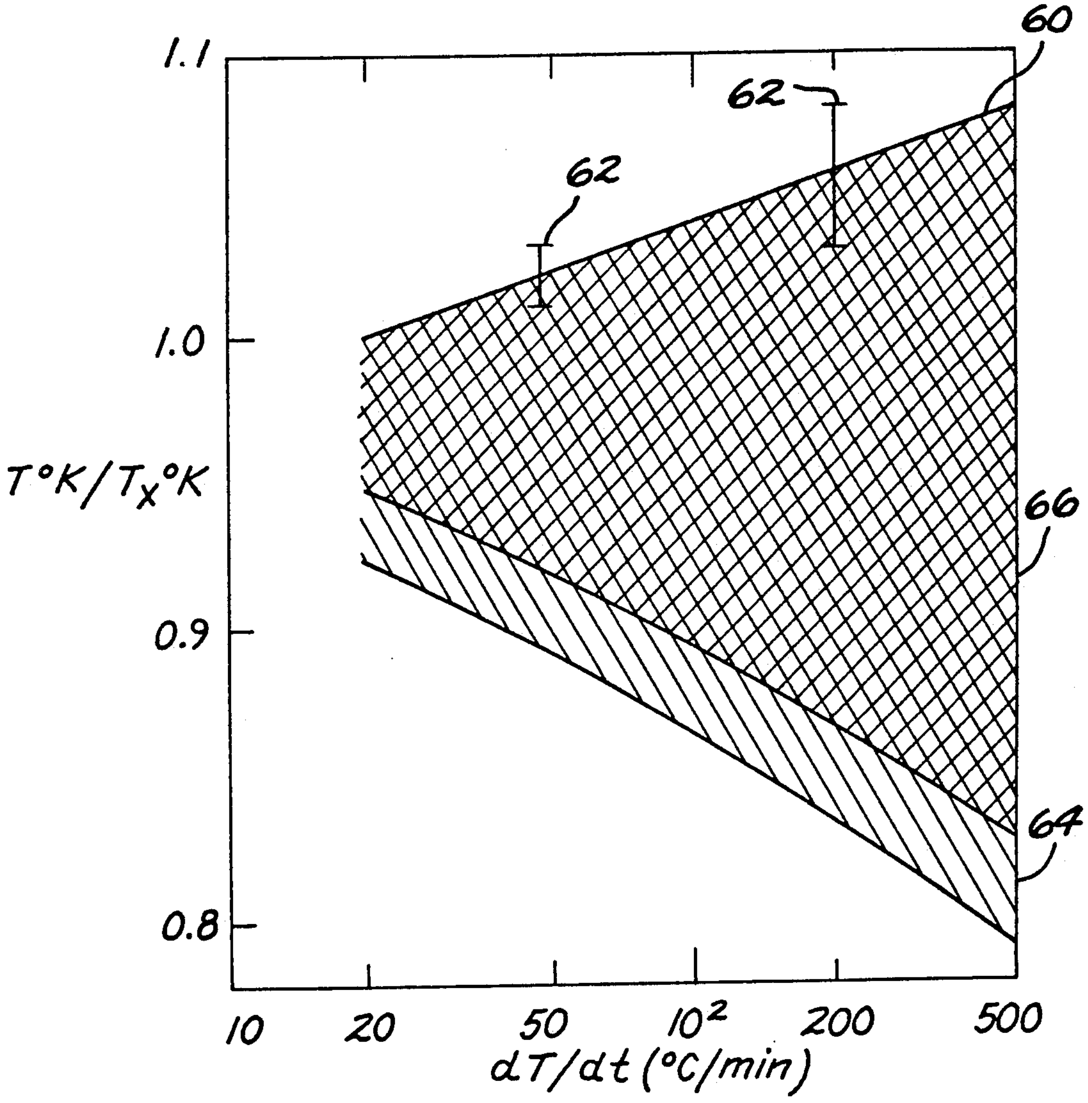
FIG. 1 illustrates in graph form the relationship between heating rates and amorphous alloy softening temperatures as used in accordance with the present invention.
Figure 2:
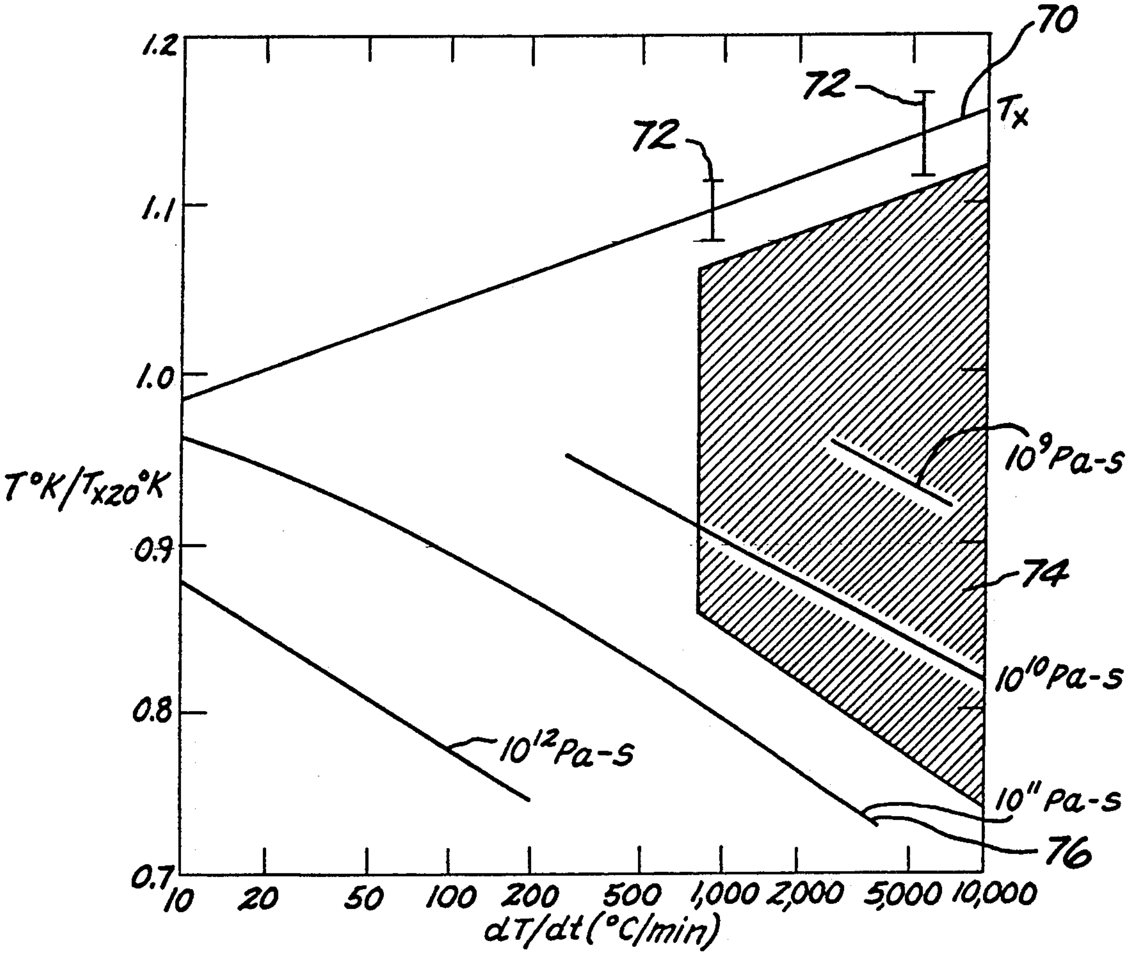
FIG. 2 illustrates the extended parameters of FIG. 1 for a situation in which hardening of the alloy can be avoided during the period of an isothermal hold.

In carrying out the method of severing a stack of alloy ribbons in accordance with the present invention, the severing operation must be performed above the softening temperature, but below the crystallization temperature of the alloy. A convenient way of expressing the temperatures in this critical range so they can be normalized to describe all amorphous alloys is to express the ratio of the temperature of an alloy sample (in T°K.) to the temperature of the onset of crystallization (Tx°K.). The ratio is T°K./Tx°K. The normalized range of softening temperatures is illustrated in the graphs of FIGS. 1 and 2 as a function of the heating rate, or the rate at which temperature changes with time dT/dt(°C./min). The temperature ratio T°K./Tx°K. is represented by the ordinate, while the heating rate dT/dt(°C./min) is plotted as a logarithmic function along the abscissa. The upper line 60 and 70 in each of the graphs of FIGS. 1 and 2 represents the temperature for the onset of crystallization for the different heating rates designated along the abscissa. Approximate error bars 62 and 72 which bracket the upper lines illustrate the variation in the temperature of onset of crystallization. These variations are due to variations on crystallization. behavior due to compositional differences.

The graph of FIG. 2 further illustrates the advantages of rapidly heating to the softening temperature at rates of 1000° C./min. or greater. At these higher rates the difference between the softening temperature and the crystallization temperature becomes so large and the flow or viscosity so low that the alloy can be worked in the "soft" state during the period of an isothermal hold, or even during minor temperature drops, if the heating rate prior to the hold is high enough.

To sever the alloy in its "soft" state while retaining desirable magnetic properties, the required combination of ramping temperature and softening and crystallization temperature can thus be found in the graphs of FIGS. 1 and 2. The required coordinates of the ramping temperature, as presented on the abscissa, and the temperature ratio, as presented on the ordinate, are those found within hatched area 64 and cross hatched area 66 of FIG. 1; and in FIG. 2 those found in hatched area 74, i.e. to the right of the 1000° C. per minute line. The significance of the hatched areas 64 and 66 of FIG. 1 and of 74 of FIG. 2 is explained more fully in the U.S. Pat. Nos. 4,584,036 and 4,715,906, the texts of which are incorporated herein by reference.

It should be understood, however, that softening can also occur at heating rates at and above 1000° C./min., within the range of coordinates which lie within extensions of lines 70 and 76 of FIG. 2 and which may rise to ramping temperatures of 10,000° C./min. and higher. Such very high ramping rates are feasible by electric resistance heating.

Figure 3:
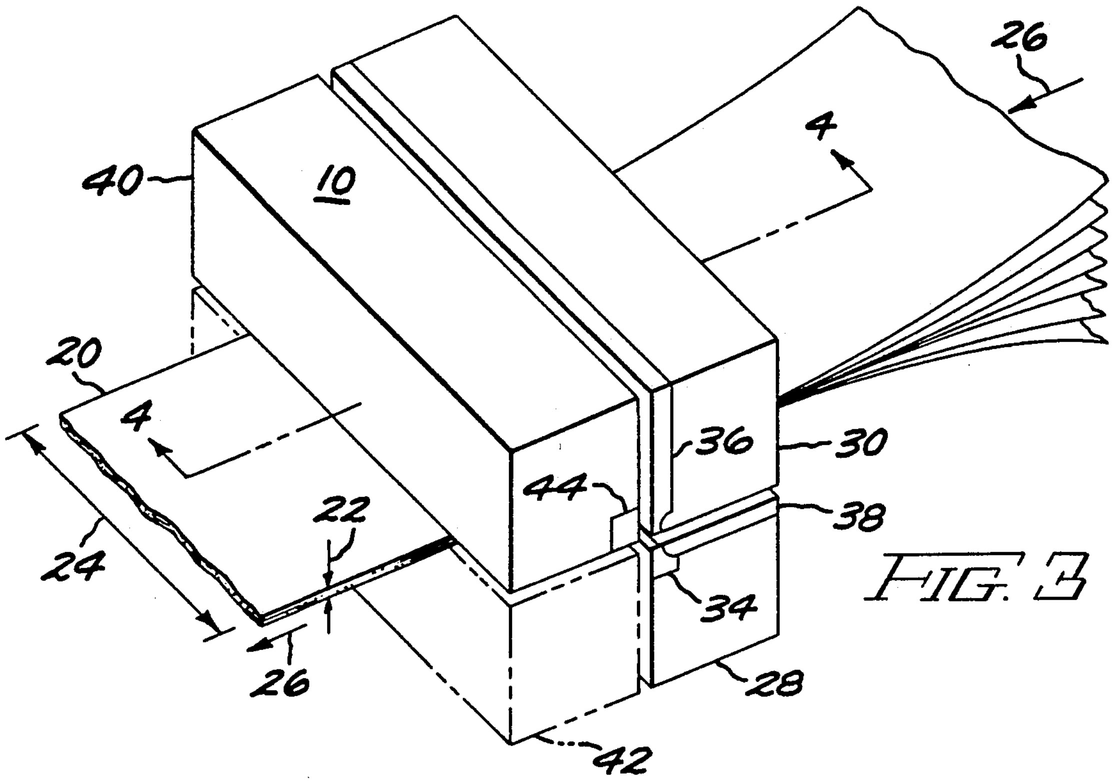
FIG. 3 is a perspective illustration in part in phantom of a preferred embodiment of apparatus for severing a stack of ribbons in accordance with the present invention.

As shown, in FIG. 3 a stack 20 of amorphous alloy ribbons has a thickness 22, and a width 24. The stack is clamped between a stationary shear blade 28 and a pressure pad 30, which are themselves part of a shearing mechanism 10. The length of stack 20, schematically indicated by arrows 26, is such that the stack extends beyond mechanism 10, the object being to cut through the stack along a separation path which is parallel to width dimension 24. Mechanism 10 further includes a movable shear blade 40 in alignment with an optional pressure pad 42. As further shown in FIG. 3, each of members 28, 30, 40 and 42 at least extends across the width of the stack.

Figure 4:
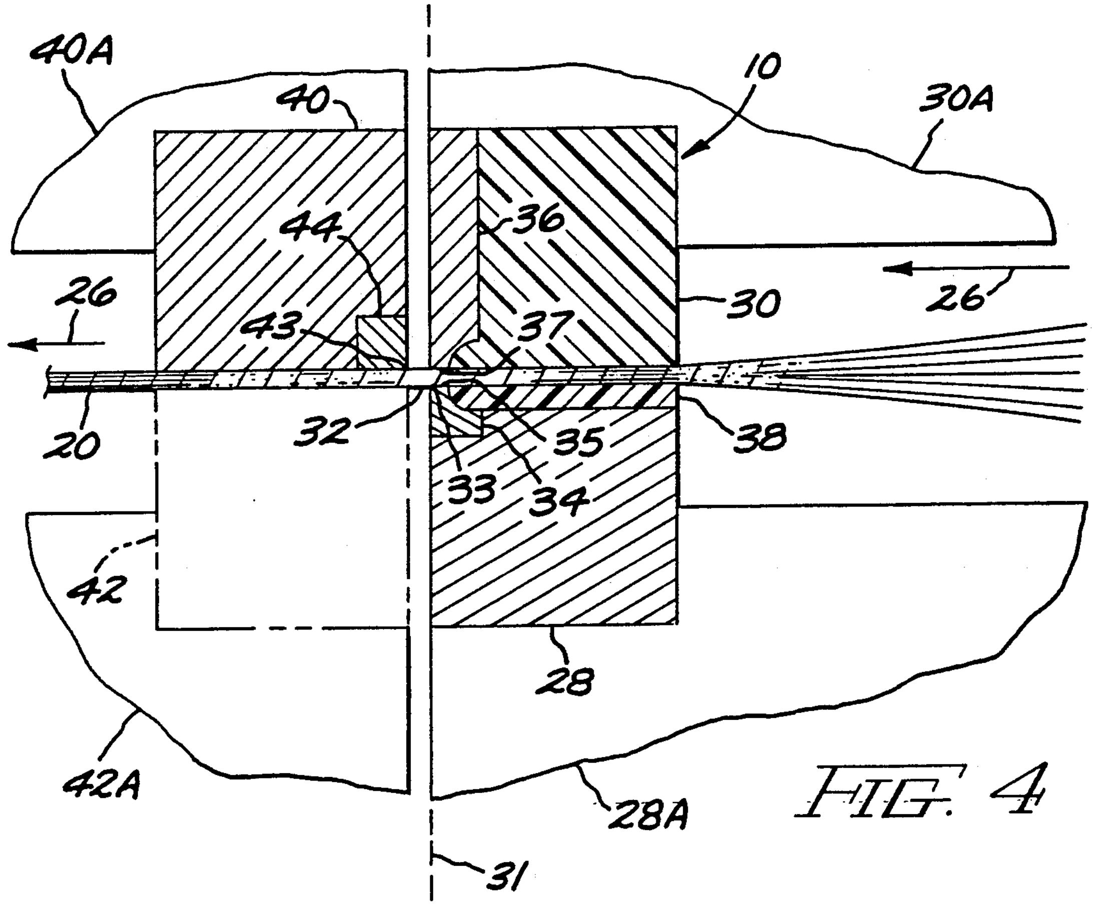
FIG. 4 is a cross-sectional view of the apparatus of FIG. 3 taken along line 4—4 of FIG. 3.

Referring to FIG. 4, each member of shearing mechanism 10 may be located in its own die shoe, specifically die shoes 28A, 30A, 40A, and 42A in accordance with conventional practice. Pressure pad 30 includes an electrode insert 36, one side of which lies in a plane 31. The latter plane is immediately adjacent and parallel to a separation path 32 of stack 20 along which the stack is to be severed.

Movable shear blade 40 includes a carbide insert 44 of uniform cross section that has a cutting edge 43, sometimes herein designated as the first cutting edge. Edge 43 is aligned with and parallel to separation path 32. Stationary shear blade 28 includes a carbide electrode insert 34 that has a cutting edge 33, sometimes referred to as the second cutting edge, which also lies in plane 31. Thus, electrodes 34 and 36 are in mutual alignment. Stationary shear blade 28 also includes an electrical insulator 38 positioned intermediate a portion of the shear blade and stack 20 such that the insulator presents a surface to stack 20 substantially coplanar with a contact area 35 of electrode 34.

Carbide electrode insert 34 is formed to have a cross-section that narrows toward contact area 35 of the electrode, the latter being in contact with stack 20 when the stack is in the position shown in FIG. 4. Second cutting edge 33 forms one side of a rectangular contact area 35. Together with shear blade 28, contact area 35 extends at least across the full width of the stack. However, in the stack length direction 26 contact area 35 is as small as is possible without compromising the integrity of second cutting edge 33.

The narrow longitudinal dimension of electrode 34 described above increases the density of the current that passes between electrodes 36 and 34 and thereby enhances the heating effect of the current. Thus, heating of the resistance heating zone of the stack portion that is positioned between electrodes 34 and 36 occurs very rapidly so that the duration of current application can be shortened. Under these conditions, softening of the alloy material occurs as a result of the rapid temperature ramping and the diffused heat zone of the stack which is affected by diffusion of heat from the resistance heating zone. The ramping of temperature within the diffused heat zone is kept within predetermined limits as set forth in FIGS. 1 and 2.

For the sake of illustration, the spacing between first cutting edge 43 and plane 31 in the stack length direction 26, as well as the width of diffused heat zone 32 in the same direction, are shown exaggerated in size. It is desirable to keep this spacing small in order to cut each ribbon without forming a burr. In practice, the spacing may be on the order of 0.0001 inch, while the width of zone 32 may be about 0.001 inch. This spacing is sufficient only to permit first cutting edge 43 to pass second cutting edge 33 without interference between shear blades 28 and 40 when severing of the stack occurs.

In the preferred embodiment of the invention illustrated in FIG. 4, electrode 36 is configured to contact stack 20 along an electrode contact area 37 of the same configuration as contact area 35 which being in alignment with the latter. The width along direction 26 of contact areas 35 and 37 is preferably no greater than 0.025 inch.

Figure 5:
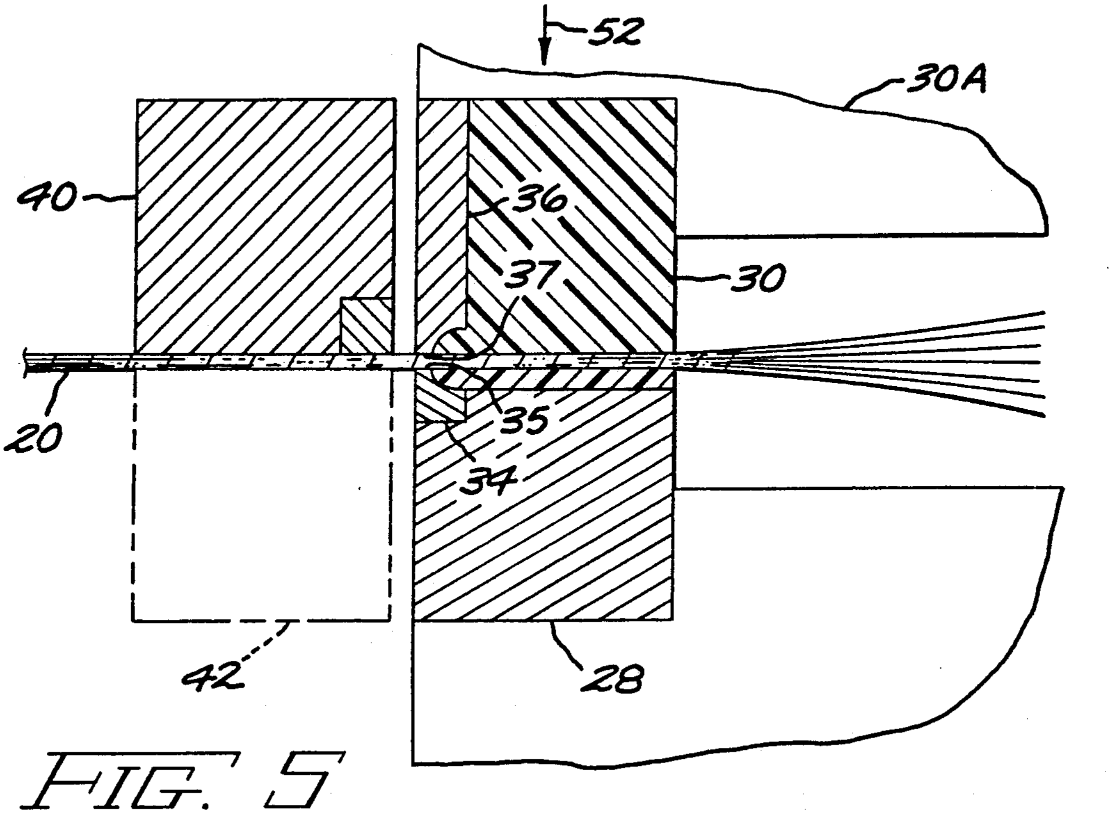
FIG. 5 is an cross-sectional view of the apparatus of FIG. 3 which illustrates the application of a clamping pressure to a ribbon stack.

In operation, and referring now to FIG. 5, pressure is applied to stack 20 through electrode contact areas 35 and 37. This may be effected through die shoe 30A by means of a conventional pressure apparatus which forms no part of the present invention. Thus, pressure pad 30 clamps stack 20 in the direction of arrow 52 against stationary shear blade 28, as illustrated in FIG. 5. The application of pressure is important to reduce the interfacial resistance between ribbons. Hence, when current is applied to the stack portion located between electrodes 34 and 36, the heating produced by the current will be uniform throughout the heating zone of this stack portion. The clamping force exerted by the pressure pad also prevents buckling and distortion of the alloy ribbon as it is heated.

Figure 6:
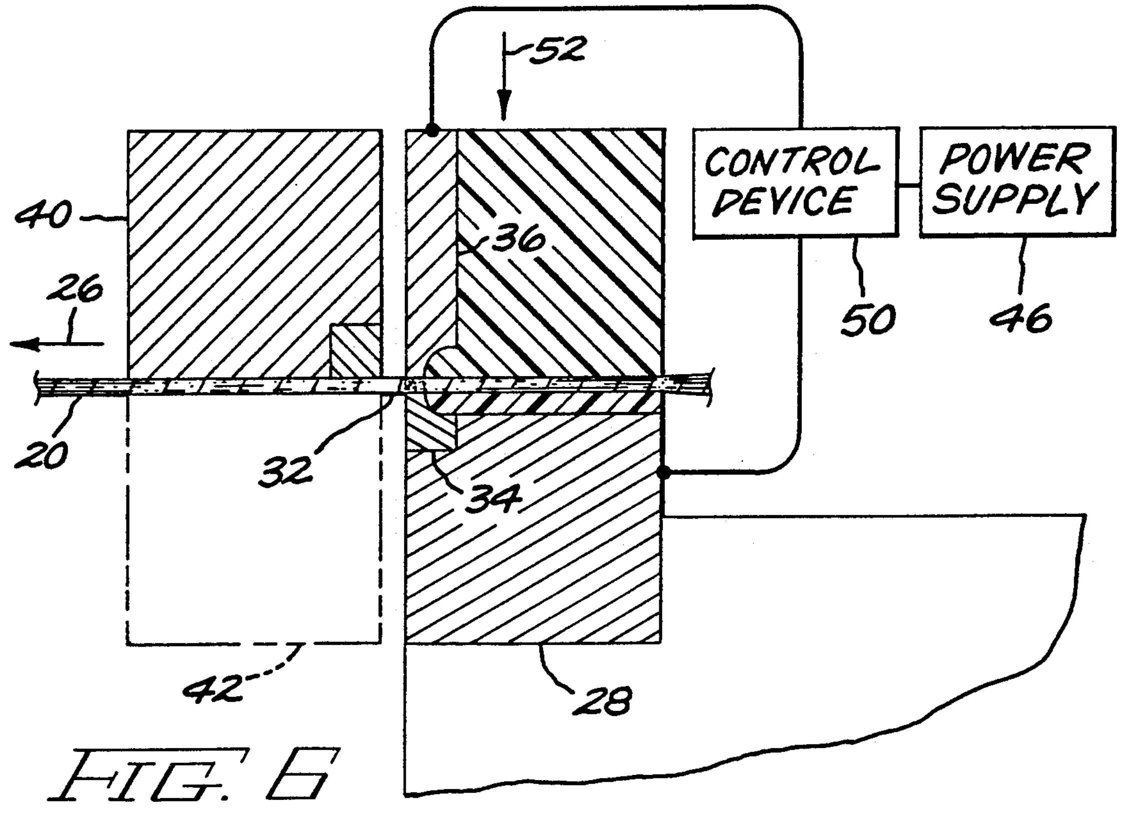
FIG. 6 is an cross-sectional view of the apparatus of FIG. 3 showing the application of a current through the stack by means of electrodes.

Referring now to FIG. 6, in operation a power source 46 supplies the above-mentioned heating current to electrodes 34 and 36. This current, which is of relatively high density due to the configuration of the electrodes, passes through the heating zone of the stack portion to produce localized heating. A current control device 50 provides the requisite timing of the interval of current application. This interval is selected to allow the generated heat to diffuse into adjacent separation zone 32 of stack 20 at a rate consistent with the rates indicated in FIGS. 1 and 2, as previously explained. In the preferred embodiment, a diffusion heated zone 32 may extend about 0.001 inch (0.0254 mm) in direction 26. Thus, the time interval during which current is applied can be kept small so that the resistance heating can occur very rapidly. Also all diffusion heating of any consequence can be limited to a very small diffused heat zone in direction 26.

Control device 50 further determines the magnitude of the applied heating current. This magnitude is chosen so that, at a minimum, the rate of temperature increase of the diffused heat zone 32 is raised into the range of temperatures and heating rates of the amorphous alloy ribbon material as set out in FIGS. 1 and 2, but remains below the crystallization temperature thereof. The resistance heating zone is also raised to rates of temperature increase which bring the diffused heat zone within the desired parameters set forth in FIGS. 1 and 2.

As explained earlier, this heating rate has been normalized for all amorphous alloys by expressing it as the temperature ratio of the softening temperature to the crystallization T°K./Tx°K. Further, the current magnitude is chosen so that such heating occurs at a rate consistent with FIGS. 1 and 2 which permits severing in the alloys "soft" state. The ramping temperature (shown along the abscissa), in combination with the temperature ratio (shown along the ordinate) which will soften the alloy, are those found in the hatched area 64 and, cross-hatched area 66 of FIG. 1, and hatched area 74 of FIG. 2, as explained above. In this way, severing of the stack can be effected in a homogeneous manner while the amorphous alloy is at a low flow stress, thereby preserving the desirable magnetic properties of the alloy while minimizing tool wear. In a preferred embodiment of the invention the length of the heating interval will be less than one second.

Figure 7:
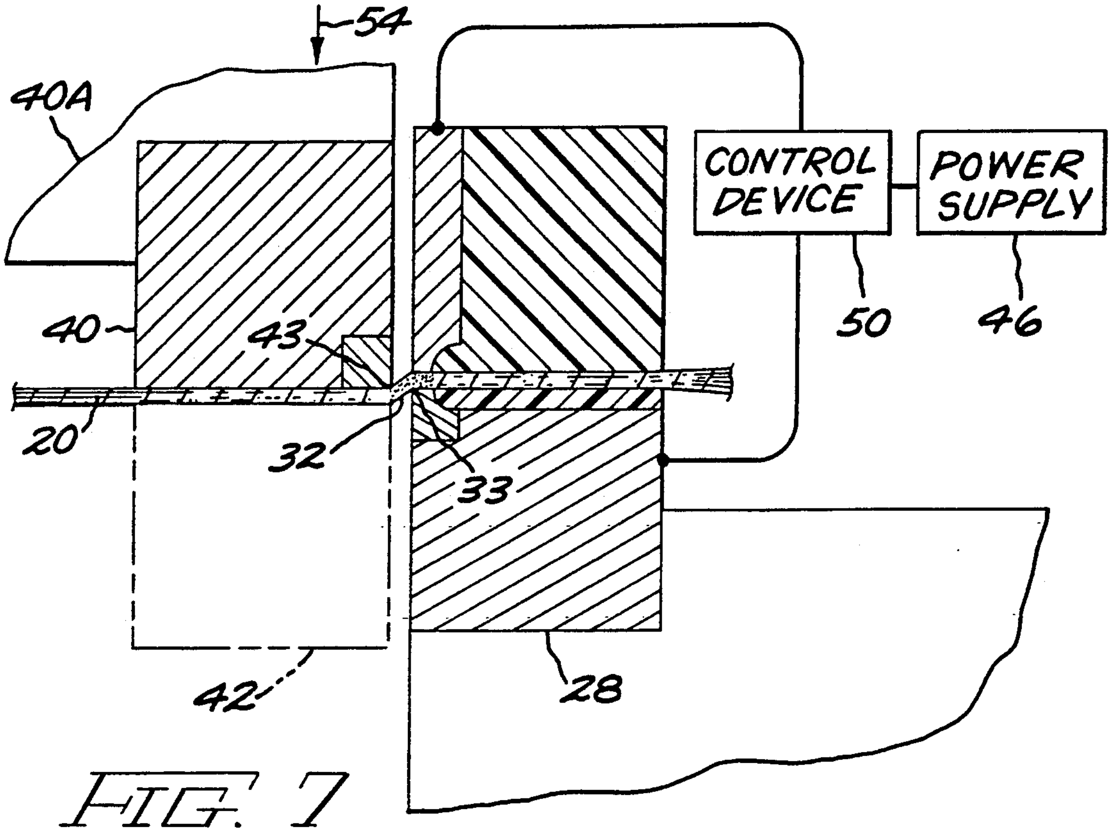
FIGS. 7 and 8 illustrate different phases of the cutting operation of the ribbon stack.

When the separation zone is heated to within the range of ramping rates where softening occurs, movable shear blades 40 is forced downward rapidly in the direction of arrow 54 in FIG. 7. The force is applied through die shoe 40A and continues until first cutting edge 43 passes completely through separation zone 32 of stack 20 and moves beyond second cutting edge 33 of stationary shear blade 28. As shown in FIG. 7, the stack is thus severed along a separation path 32 in the diffused heat zone as a result of the shearing action of cutting edges 43 and 33.

Figure 8:
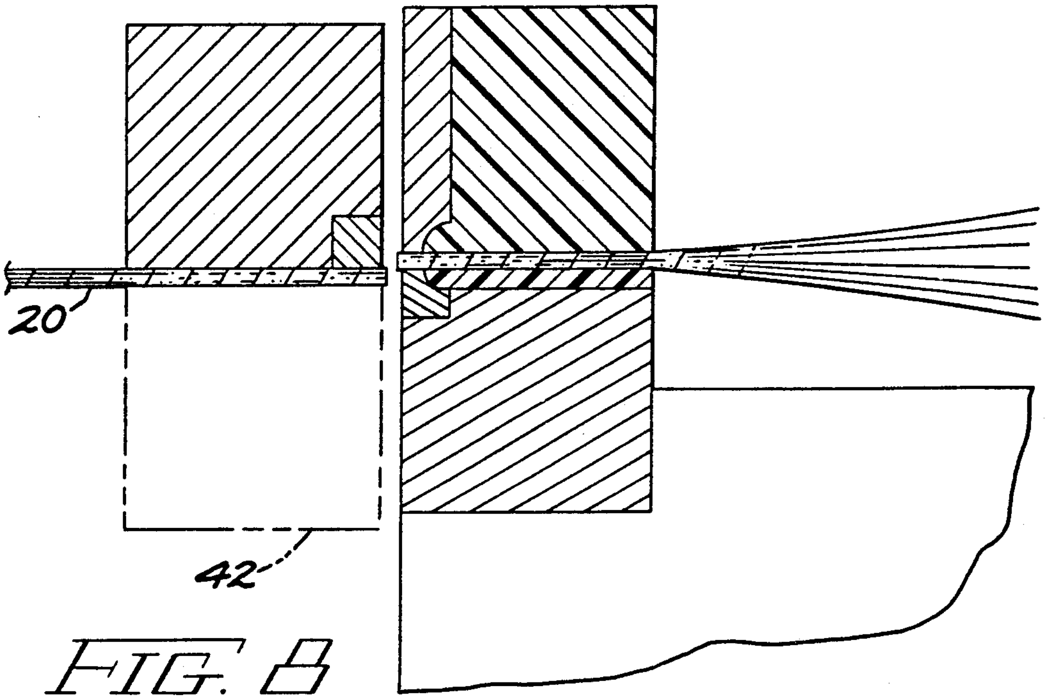

The current control device 50 acts in coordination with the motion of movable shear blade 40. The interval of current application is timed so that cutting occurs while the temperature ramping of zone 32 is still within the range of ramping temperatures of the alloy, but below its crystallization temperature. As illustrated in FIG. 8, smooth, clean, burr-free edges, which are kept within close dimensional tolerances, are produced as the cut is completed.

FIGS. 3 through 8 each show the presence of a pressure pad 42. The function of the pad is to hold the severed portion of the stack in place during and after the cut. It should be noted that the presence of pad 42 is optional and that the apparatus shown in these Figures will also perform properly without it. When the pad is used, however, it must move in combination with the motion of shear blade 40.

Because of the heating of stack 20 is confined to a very small region and it occurs rapidly, the total mass of the ribbon stack that is heated is small compared to the mass of shear blades 28 and 40 and their carbide inserts 34 and 44 respectively. As a consequence, expansion due to heating of parts 28, 34, 40 and 44 is negligible. Thus, the critical spacing between the shear blades remains substantially unaffected.

While the present invention has been shown and particularly described with reference to a preferred embodiment, it is understood that various changes in form and detail, as well as various substitutions and equivalents will now occur to those skilled in the art. Accordingly, it is intended that the invention is limited only by the scope of the appended claims.

What is claimed and sought to be protected by Letters Patent of the United States is as follows:

1. Apparatus for shearing a stack of amorphous alloy ribbons which comprises, means for supplying a plurality of ribbons to be sheared as a stack, means for compressing the stack of ribbons in a heating zone to reduce the electrical resistance between confronting surfaces of the ribbons of said stack, resistance heating current supply means, means for passing said resistance heating current through said heating zone for a time to induce heating by diffusion in a diffused heat zone adjacent said heating zone at a rate and to a temperature which conforms to the hatched areas of FIGS. 1 and 2 of the drawings of the subject application, and means for shearing said stack of ribbons in said diffused heat zone the width dimension of the means for passing resistance heating current to the heating zone, oriented in the length dimension of the stack, is no greater than 0.025 inches.

* * * * *